(12) United States Patent
Barak

(10) Patent No.: US 11,812,741 B2
(45) Date of Patent: Nov. 14, 2023

(54) METHOD FOR PRODUCING A BIOCIDE

(71) Applicant: A.Y. LABORATORIES LTD., Tel Aviv (IL)

(72) Inventor: Ayala Barak, Tel Aviv (IL)

(73) Assignee: A.Y. LABORATORIES LTD., Tel Aviv (IL)

(*) Notice: Subject to any disclaimer, the term of this patent is extended or adjusted under 35 U.S.C. 154(b) by 0 days.

(21) Appl. No.: 17/621,014

(22) PCT Filed: Jun. 17, 2020

(86) PCT No.: PCT/IL2020/050669
§ 371 (c)(1),
(2) Date: Dec. 20, 2021

(87) PCT Pub. No.: WO2021/001816
PCT Pub. Date: Jan. 7, 2021

(65) Prior Publication Data
US 2022/0322660 A1    Oct. 13, 2022

Related U.S. Application Data

(60) Provisional application No. 62/869,273, filed on Jul. 1, 2019.

(51) Int. Cl.
| | | |
|---|---|---|
| A01N 25/02 | (2006.01) | |
| A01P 1/00 | (2006.01) | |
| A01N 47/12 | (2006.01) | |
| A01N 59/00 | (2006.01) | |

(52) U.S. Cl.
CPC ............. *A01N 25/02* (2013.01); *A01N 47/12* (2013.01); *A01N 59/00* (2013.01); *A01P 1/00* (2021.08)

(58) Field of Classification Search
CPC ........ A01N 25/02; A01N 47/12; A01N 59/00; A01P 1/00; A01P 3/00; A01P 13/00
See application file for complete search history.

(56) References Cited

U.S. PATENT DOCUMENTS

| | | | |
|---|---|---|---|
| 9,801,384 B2 * | 10/2017 | Barak | ............... A01N 59/00 |
| 10,575,527 B2 * | 3/2020 | Barak | ............. B01J 19/0006 |
| 2009/0214672 A1 | 8/2009 | Ramesh et al. | |
| 2012/0021062 A1 | 1/2012 | Gupta et al. | |
| 2015/0367315 A1 | 12/2015 | Barak | |
| 2017/0367343 A1 | 12/2017 | Barak | |

FOREIGN PATENT DOCUMENTS

| | | | |
|---|---|---|---|
| CN | 101151219 | 3/2008 | |
| CN | 103053613 | 4/2013 | |
| CN | 104204352 | 12/2014 | |
| CN | 104981436 | 10/2015 | |
| CN | 105829250 | 8/2016 | |
| CN | 107604695 | 1/2018 | |
| CN | 109769855 | 5/2019 | |
| JP | 2008-221152 | 9/2008 | |
| JP | 5187928 | 4/2013 | |
| JP | 2014-176801 | 9/2014 | |
| WO | WO-2014122652 A1 * | 8/2014 | ............. A01N 25/02 |
| WO | 2021/001816 | 1/2021 | |

OTHER PUBLICATIONS

An International Search Report and a Written Opinion both dated Aug. 18, 2020, which issued during the prosecution of Applicant's PCT/IL2020/050669.
An International Preliminary Report on Patentability dated Dec. 28, 2021, which issued during the prosecution of Applicant's PCT/IL2020/050669.
U.S. Appl. No. 62/869,273, filed Jul. 1, 2019.
European Search Report dated Jun. 22, 2023 which issued during the prosecution of Applicant's European App No. 20834520.7.
An Office Action dated Aug. 31, 2023, which issued during the prosecution of Singapore Patent Application No. 11202112893S.

* cited by examiner

*Primary Examiner* — Mina Haghighatian
*Assistant Examiner* — Nathan W Schlientz
(74) *Attorney, Agent, or Firm* — Leason Ellis LLP

(57) ABSTRACT

A method for producing a biocide from a hypochlorite oxidant and an ammonium salt is provided. The method focuses on preventing and/or reducing the presence of excess ammonium. The molar ratio of ammonium to hypochlorite is less than 1:1. In a preferred embodiment, the method includes monitoring the conductivity of the biocide to optimize the ratio between the hypochlorite oxidant and the ammonium salt. The optimum ratio is that at which the conductivity has a local maximum.

19 Claims, 2 Drawing Sheets

METHOD FOR PRODUCING A BIOCIDE

CROSS-REFERENCE TO RELATED PATENT APPLICATIONS

This application is a U.S. National Stage Application under 35 U.S.C. § 371 of International Patent Application No. PCT/IL2020/050669 filed Jun. 17, 2020, which claims the benefit of U.S. Provisional Application No. 62/869,273 filed on Jul. 1, 2019, both of which are incorporated by reference in their entireties. The International Application was published on Jan. 7, 2021, as International Publication No. WO/2021/001816 A1.

Reference is made to U.S. patent application Ser. No. 07/892,533, filed Jun. 1, 1992 and entitled PROCESS AND COMPOSITIONS FOR THE DISINFECTION OF WATERS, U.S. patent application Ser. No. 08/809,346, filed Jan. 27, 1998 and entitled METHOD AND APPARATUS FOR TREATING LIQUIDS TO INHIBIT GROWTH OF LIVING ORGANISMS, U.S. patent application Ser. No. 10/586,349, filed Jul. 14, 2006 and entitled BIOCIDES AND APPARATUS, and U.S. patent application Ser. No. 14/765,335, filed Aug. 1, 2015 and entitled METHOD FOR CONTROLLING THE PRODUCTION OF A BIOCIDE the disclosures of which are hereby incorporated by reference.

FIELD OF THE INVENTION

The present invention relates to a method for production of a biocide.

BACKGROUND OF THE INVENTION

Various techniques are known for producing and using biocides.

SUMMARY OF THE INVENTION

The present invention seeks to provide a method for producing a biocide.

There is thus provided in accordance with a preferred embodiment of the present invention a method for producing a biocide including: providing a solution of a hypochlorite oxidant; providing a solution of an ammonium salt; and mixing the solution of a hypochlorite oxidant with the solution of an ammonium salt; wherein the molar ratio of the ammonium to the hypochlorite oxidant is less than 1:1. Preferably, the hypochlorite oxidant is sodium hypochlorite.

In accordance with a preferred embodiment of the present invention, the solution of a hypochlorite oxidant is prepared by diluting a concentrated solution of about 8-18% with water immediately prior to use. Preferably, the solution of a hypochlorite oxidant has a concentration from about 1000 to about 20,000 ppm, more preferably from about 3000 to about 10,000 ppm, and most preferably from about 3500 to about 7000 ppm.

In accordance with a preferred embodiment of the present invention, the ammonium salt is selected from ammonium bicarbonate, ammonium carbonate, ammonium carbamate, ammonium hydroxide, ammonium sulfamate, ammonium bromide, ammonium chloride and ammonium sulfate. Preferably, the ammonium salt is selected from ammonium carbamate, ammonium bromide, ammonium hydroxide and ammonium sulfate. Most preferably, the ammonium salt is ammonium carbamate. In accordance with another preferred embodiment, the ammonium salt is a mixture of two or more ammonium salts.

In accordance with a preferred embodiment of the present invention, the solution of an ammonium salt is prepared by diluting a concentrated solution of about 15-50% with water or with the solution of a hypochlorite oxidant immediately prior to use. Preferably, the solution of an ammonium salt has a concentration from about 1,000 to about 50,000 ppm, more preferably, from about 12,000 to about 30,000 ppm. In accordance with a preferred embodiment of the present invention, the solution of an ammonium salt further includes a base. Preferably, the base is sodium hydroxide.

Preferably, the method further includes monitoring the conductivity of the biocide. In accordance with a preferred embodiment of the present invention, the method includes: providing an amount of the solution of an ammonium salt; adding a plurality of amounts of the solution of a hypochlorite oxidant to the amount of the solution of an ammonium salt under mixing conditions; measuring the control parameter after the addition of each discrete amount of the solution of a hypochlorite oxidant; and ceasing to add amounts of said solution of a hypochlorite oxidant when a maximum in the conductivity is observed after the observation of a conductivity minimum.

In an alternative embodiment, the method includes: mixing a stream of a hypochlorite solution with a stream of an ammonium salt solution in a mixing chamber at an ammonium:hypochlorite molar ratio of greater than 1:1; holding the flow rate of one of the streams constant and gradually increasing or decreasing the flow rate of the other of the streams in order to decrease the ammonium:hypochlorite molar ratio; monitoring the value of the conductivity in a stream leaving the mixing chamber; and selecting an ammonium:hypochlorite molar ratio to be equal to the ammonium:hypochlorite molar ratio wherein the conductivity value has a local maximum. In one embodiment, the monitoring is continuous. In an alternative embodiment, the monitoring includes measuring the control parameter in discrete samples of the stream leaving the mixing chamber.

BRIEF DESCRIPTION OF THE DRAWING

The present invention will be understood and appreciated more fully from the following detailed description, taken in conjunction with the drawing in which.

DETAILED DESCRIPTION OF THE INVENTION

Figure 1:
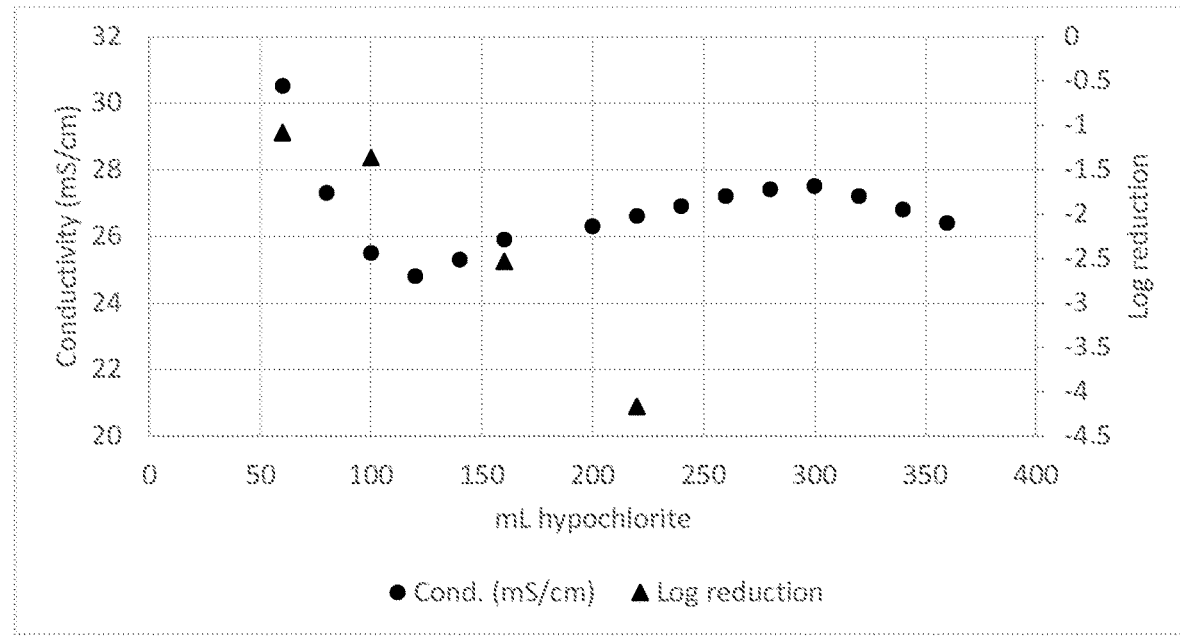
FIG. 1 is a graph showing the change of conductivity during the production of a biocide and the results of microorganism kill tests using the biocide.

As described in published European Patent Publication No. 0 517 102, the contents of which are incorporated herein by reference, biological fouling of circulating water is a well known problem caused by algae, fungi, bacteria, and other simple life forms found in circulating water. That patent publication describes controlling biofouling in high chlorine demand waters by mixing two components, one of which is an oxidant and the other an ammonium salt, and adding the mixture substantially immediately to the aqueous system to be treated. This produces the active biocidal ingredient, as described therein. A large number of examples of oxidants and ammonium salts are described in that patent publication.

A problem encountered in this method of treating liquid to inhibit growth of living organisms, however, is that the concentrated active biocidal ingredient is extremely non-stable chemically and quickly decomposes upon formation with the result that there is a fast drop in pH. This is especially so for the active biocidal ingredients derived from ammonium bromide where the decomposition results in the undesirable formation of HOBr. Therefore, when conventional dosing pumps and mixers are used, the formed active biocidal ingredient quickly decomposes and loses its efficacy. Also, while the pH range of such concentrated active biocide is theoretically 8.0-12.5, actually the pH never exceeds 8.0 because of the fast decomposition. In addition, the ammonium salts needed to be supplied in excess in order to decrease the decomposition rate.

In U.S. Pat. No. 5,976,386, the contents of which are incorporated herein by reference, a method and apparatus for producing a biocide are disclosed that enable a constant ratio of oxidant/amine source to be maintained, thereby avoiding the need to use excess amine source in order to stabilize the reaction product and to maintain a reproducible product containing almost no degradation products. The novel method described therein includes producing an efficient in situ dilution of both the oxidant and the amine source and synchronously metering the two dilutions into a conduit to continuously mix therein according to a predetermined ratio to produce an active biocidal ingredient. The predetermined ratio was an amine to oxidant ratio of at least 1:1. That is, no excess of oxidant was possible and was prevented by the presence of excess ammonium.

As already described in U.S. Pat. No. 5,976,386, careful control of the biocide formation is necessary. The biocide production process uses a multiple feeding point system requiring a separate control for each feed line since different pumps respond differently to pressure change, and pump feed rates depend on the water flow pressure. As for any on-site process, an online control is needed to ensure production of the right product at high yield, and with minimal side products. Furthermore, the above referenced patents disclose that equimolar amounts of ammonium and hypochlorite are necessary for optimal performance. It was shown that excess hypochlorite, even local excess, leads to production of multi-chlorinated chloramines and degradation of the biocidal product monochloramine (MCA) to form $NO_x$ species and inorganic acids. With insufficient hypochlorite, the ammonium does not fully react, leading to a lower biocide concentration, excessive use of chemicals, higher cost of treatment, etc. The components used to make the biocide, such as sodium hypochlorite and ammonium carbamate, disclosed in U.S. Pat. No. 7,837,883, the contents of which are incorporated herein by reference, are unstable chemicals, and degrade with time during use. As a result, operating the feeding unit under pre-determined constant feed rates of the two reagents will produce variable products. In addition, other parameters such as water temperature, high concentration of the produced biocide and water quality can enhance degradation of the biocide.

In U.S. Pat. No. 5,976,386 is disclosed the use of pH as an indicator of the end point of the reaction between an ammonium salt and sodium hypochlorite. Addition of hypochlorite to an ammonium salt solution increases the pH. However, after the equimolar point, the hypochlorite begins to degrade the biocidal MCA forming inorganic acids, which lower the pH. Thus, pH can be used as an indicator of the end point. However, pH was found to be an accurate indicator only at relatively low pH values. As biocide production takes place at relatively high pH, there was a need for other indicators.

U.S. Pat. No. 9,801,384, the contents of which are incorporated herein by reference in their entirety, discloses additional parameters which can be used to indicate the end point of the reaction between an ammonium salt and a hypochlorite oxidant. Specifically, oxidation-reduction potential (ORP), conductivity and induction were all shown to have a relative minimum at the end point. Dissolved oxygen was shown to have a constant value during the reaction and to rapidly decrease at the end point. These parameters were shown to be effective in identifying the end point of the reaction, with the assumption that if the end point was missed and excess hypochlorite was added, the result would be decomposition of the biocide and loss of efficacy. Thus, even when the endpoint is identified, it has been customary to work slightly above the 1:1 ammonium to hypochlorite ratio in order to avoid decomposition by excess hypochlorite.

In summary, prior to the present invention it was well established that when preparing a biocide from an ammonium salt and a hypochlorite oxidant, it was necessary to avoid excess hypochlorite, and in practice, to use a slight excess of ammonium salt. It has now been found that excess ammonium is detrimental to the biocidal activity, and addition of additional hypochlorite after the apparent equimolar point results in a more effective biocide.

In accordance with a first embodiment of the present invention, there is provided a method for producing a biocide comprising mixing a solution of a hypochlorite oxidant with a solution of an ammonium salt wherein the molar ratio of ammonium to hypochlorite is less than 1:1.

In one embodiment, the biocide is produced in a batch process. The batch process comprises adding a solution of a hypochlorite oxidant to a solution of an ammonium salt while mixing and monitoring the conductivity. After a local minimum in the conductivity is observed, additional hypochlorite is added until a local maximum in the conductivity is observed. It is believed that the local maximum in conductivity represents the absence of excess ammonium. The biocide so produced can be used immediately or stored for later use.

In an alternative embodiment, the biocide is produced in a continuous process. In the continuous process, a solution of hypochlorite and a solution of ammonium salt are mixed continuously in a mixer, and the conductivity is monitored online in the mixer or in a conduit downstream from the mixer or is measured in discrete samples removed from the mixer. The flow rate of one of the solutions is held constant while the flow rate of the other solution is varied so as to decrease the ammonium to hypochlorite ratio until a local minimum in the conductivity is observed. The ratio is decreased further until a local maximum in the conductivity is observed. Typically, monitoring of the conductivity control parameter is continued in order to identify the need to adjust the flow rates as a result of a change in the concentration of one or both of the solutions. The biocide produced in the continuous process can be applied to a medium as it is produced or can be stored for later use.

As stated above, hypochlorite is added to the ammonium salt until a local maximum in conductivity is observed. Additional hypochlorite may be added beyond the point of maximum conductivity. For example, the additional hypochlorite may be 2%, 5%, 10%, 15% or 20% of the hypochlorite added up until the maximum conductivity. However, for reasons of process control, the conductivity maximum may be used since this is an easily identifiable point.

The hypochlorite oxidant can be any hypochlorite oxidant, such as the hypochlorite salt of an alkali metal or alkaline earth metal. Preferably, the hypochlorite salt is sodium hypochlorite, potassium hypochlorite or calcium hypochlorite. Most preferably, the hypochlorite salt is sodium hypochlorite.

The hypochlorite solution is preferably prepared by mixing a concentrated stock solution of hypochlorite with water to form a hypochlorite dilution. The ammonium salt solution is preferably prepared by mixing a concentrated stock solution of the ammonium salt with water or with the hypochlorite dilution to form an ammonium salt dilution. When the ammonium stock solution is diluted with water to prepare an ammonium salt dilution that is equimolar with the hypochlorite dilution, the final concentration of the biocide will be half the concentration of the hypochlorite dilution. On the other hand, when the ammonium stock solution is diluted with the hypochlorite dilution, the final concentration of the biocide will be equal to the concentration of the hypochlorite dilution.

The concentration of the hypochlorite dilution is preferably from about 1000 to about 20,000 ppm. More preferably, the concentration of the hypochlorite solution is from about 3000 to about 10,000 ppm. Most preferably, the concentration of the hypochlorite solution is from about 3500 to about 7000 ppm. The hypochlorite solution is preferably prepared by diluting a stock solution of about 8-18% with water immediately prior to use. Preferably, the hypochlorite dilution is prepared immediately before use. When the biocide is formed in a continuous process, the hypochlorite dilution is preferably prepared online as it is needed.

Any ammonium salt can be used in the method of the present invention. Preferably, the ammonium salt is selected from ammonium bicarbonate, ammonium bromide, ammonium carbamate, ammonium carbonate, ammonium chloride, ammonium hydroxide, ammonium sulfamate and ammonium sulfate. More preferably, the ammonium salt is selected from ammonium bromide, ammonium carbamate, ammonium carbonate, ammonium chloride, ammonium sulfamate and ammonium sulfate. Even more preferably, the ammonium salt is selected from ammonium bromide, ammonium carbamate, ammonium hydroxide and ammonium sulfate. Most preferably, the ammonium salt is ammonium carbamate. In one embodiment, the ammonium salt includes a mixture of two or more ammonium salts.

In one embodiment, the ammonium salt dilution is prepared by diluting a 15-50% stock solution of the ammonium salt in water to a concentration of about 1,000 to about 50,000 ppm, more preferably, about 12,000 to about 30,000 ppm. Preferably, the ammonium salt dilution is prepared immediately before use. When the biocide is formed in a continuous process, the ammonium salt dilution is preferably prepared online as it is needed.

In an alternative embodiment, the ammonium salt dilution is prepared by diluting the stock solution of the ammonium salt with a portion of the diluted hypochlorite solution. This method produces an ammonium salt dilution with a higher pH since the hypochlorite solution is basic. This is advantageous for some salts, such as ammonium carbamate, which are more stable at high pH.

In some embodiments, the initial pH of the ammonium salt dilution is preferably at least 9.0, more preferably at least 10.0, even more preferably at least 10.4, and most preferably at least 10.8. In one preferred embodiment, the ammonium salt dilution comprises sodium hydroxide. In particular, when the ammonium salt is ammonium bromide or ammonium sulfate, sodium hydroxide is added to the ammonium salt dilution to raise the pH to at least 10.0, preferably at least 10.4, in order to make the conductivity maximum observable.

EXAMPLES

Example 1

A solution of ammonium carbamate was formed by dissolving 100 g ammonium carbamate in 400 g water to form a 20% solution. A concentrated solution of sodium hypochlorite was diluted to a concentration of 5000 ppm. 2.6 ml of the ammonium carbamate solution were mixed with 30 ml diluted hypochlorite and the resulting solution was titrated with the dilute hypochlorite. Hypochlorite was added in 10 ml aliquots, and the conductivity of the solution was monitored throughout the titration.

The conductivity minimum was found to be at a N:Cl ratio of 3.89. The nitrogen amount includes both the ammonium and the carbamate nitrogens. Thus, the equimolar point, assuming that only the ammonium nitrogen reacts with the hypochlorite, is at a 2:1 ratio. The conductivity minimum occurring prior to the expected equimolar point is reflective of the unstable nature of ammonium carbamate which tends to lose ammonia and thus the actual N:Cl ratio is lower than the calculated ratio. The pH of the solution may also have an effect on the conductivity minimum. This highlights the need for a control parameter in the production of the biocide. Addition of hypochlorite continued passed the minimum point, and a conductivity maximum occurred at a N:Cl ratio of 1.49 (130 ml hypochlorite).

Samples of the biocide after addition of 50, 100, 150 and 200 ml hypochlorite were taken for microorganism kill tests. The biocides were added at varying concentrations to a sample containing pseudomonads or *E. coli*. The reduction in microorganisms was measured and shown in Tables 1 and 2.

Since at the beginning of each test, the ammonium salt is in excess, the biocide concentration is equal to the concentration of hypochlorite. As more hypochlorite is added, the amount of excess ammonium decreases. In each of the sets of tests, there is a constant biocide concentration while only the amount of excess ammonia changes. In all of the tests, as the amount of excess ammonia decreases the efficacy of the biocide increases without changing the biocide concentration. This shows, contrary to what was previously believed, that excess ammonia is deleterious to the biocidal activity.

TABLE 1

Pseudomonads kill results

| Biocide concentration (ppm as total chlorine) | Total hypochlorite (ml) | Log reduction | N:Cl ratio |
|---|---|---|---|
| 0.75 | 50 | −1.19 | 3.89 |
|  | 100 | −1.90 | 1.95 |
|  | 150 | −2.15 | 1.3 |
|  | 200 | −6.60 | 0.97 |
| 1.00 | 50 | −3.10 | 3.89 |
|  | 100 | −4.24 | 1.95 |
|  | 150 | −5.00 | 1.3 |
|  | 200 | −7.60 | 0.97 |

TABLE 2

E. coli kill results

| Biocide concentration (ppm as total chlorine) | Total hypochlorite (ml) | Log reduction | N:Cl ratio |
|---|---|---|---|
| 0.5 | 50 | −0.35 | 3.89 |
| | 100 | −0.28 | 1.95 |
| | 150 | −0.41 | 1.3 |
| | 200 | −6.02 | 0.97 |
| 1.0 | 50 | −1.15 | 3.89 |
| | 100 | −1.28 | 1.95 |
| | 150 | −1.48 | 1.3 |
| | 200 | −5.12 | 0.97 |
| 1.5 | 50 | −2.5 | 3.89 |
| | 100 | −2.56 | 1.95 |
| | 150 | −4.09 | 1.3 |
| | 200 | −5.54 | 0.97 |

Example 2

5.1 ml of a 20% ammonium carbamate solution containing 8% sodium hydroxide were diluted in 60 ml of a 5000 ppm sodium hypochlorite solution. Sodium hypochlorite was added in 20 ml portions, and the conductivity was measured at each step. At several points, a sample of the biocide was taken and used at a concentration of 1.0 ppm in a kill test on pseudomonads. The results are shown in FIG. 1. The local minimum in the conductivity followed by a local maximum can be clearly seen. While it was previously thought that the conductivity minimum represented the ideal ratio of hypochlorite to ammonium, it can be seen that the activity of the biocide continues to improve past the minimum and towards the maximum.

Example 3

Figure 2:
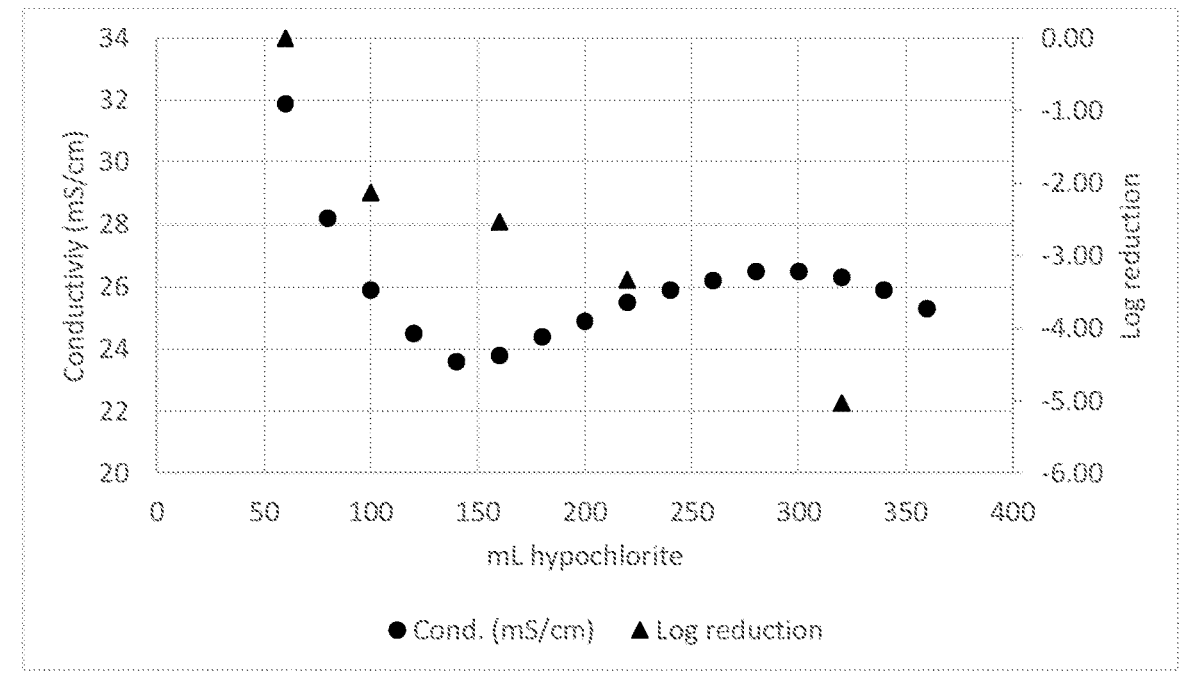
FIG. 2 is a graph showing the change of conductivity during the production of a biocide and the results of microorganism kill tests using the biocide.
Figure 3:
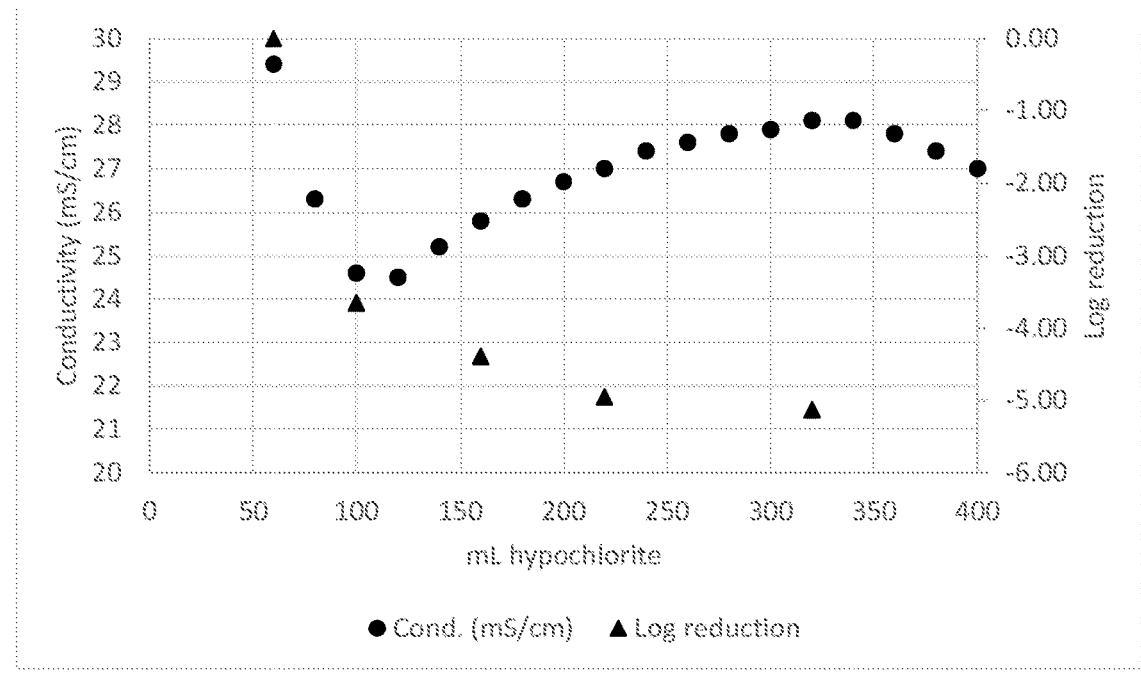
FIG. 3 is a graph showing the change of conductivity during the production of a biocide and the results of microorganism kill tests using the biocide.

A biocide was prepared as in Example 2 except that the ammonium salt consisted of 90% ammonium carbamate and 10% of ammonium bromide or ammonium hydroxide. Kill tests on pseudomonads at a concentration of 1.0 ppm were performed at several points. The results are shown in FIG. 2 (ammonium bromide) and FIG. 3 (ammonium hydroxide). In these tests too, it can be seen that activity of the biocide improves well past the conductivity minimum and until the conductivity maximum.

Example 4

A biocide was prepared as in Example 1 starting with a solution of ammonium carbamate containing varying amounts of sodium carbonate. After addition of 130 ml hypochlorite (N:Cl ratio of 1.297), the biocides were taken for a kill test with *pseudomonas*. The results are shown in Table 3.

TABLE 3

Effect of sodium carbonate

| Biocide concentration (ppm as total chlorine) | Carbamate:carbonate molar ratio | Log reduction |
|---|---|---|
| 0.75 | 0 | −4.65 |
| | 53.43 | −4.43 |
| | 10.686 | −4.12 |
| | 7.124 | −3.4 |
| | 5.343 | −3.2 |

TABLE 3-continued

Effect of sodium carbonate

| Biocide concentration (ppm as total chlorine) | Carbamate:carbonate molar ratio | Log reduction |
|---|---|---|
| 1.0 | 0 | −6.6 |
| | 53.43 | −5.62 |
| | 10.686 | −5.2 |
| | 7.124 | −5.3 |
| | 5.343 | −5.17 |

Addition of carbonate to the ammonium salt prior to the preparation of the biocide reduced the efficacy of the biocide. It is hypothesized that the carbonate ion acts as a scavenger for chlorine, thus reducing the chlorination of the ammonium and the effective concentration of the monochloramine biocide, and increasing the amount of excess ammonium. That the carbonate does not interfere with the activity of the already produced biocide was shown in a different experiment. Biocide was produced from ammonium carbamate without any carbonate. Sodium carbonate was added to the medium to be treated prior to the addition of the biocide. No reduction in efficacy was observed even at carbonate levels that were equimolar to the carbamate concentration.

Example 5

A biocide was prepared as in Example 1. Samples of the biocide after addition of 80 and 170 ml hypochlorite (N:Cl ratios of 2.43 and 1.14, respectively) were used to treat white water from a packaging plant having a mixture of microorganisms. The biocides were added to different samples at concentrations of 1, 5 and 10 ppm, and the log reduction was measured over time for 24 hours. The results are shown in Table 4.

TABLE 4

Treatment of white water over time

| Biocide concentration (ppm as total chlorine) | Total hypochlorite (ml) | Log reduction (3 hours) | Log reduction (24 hours) |
|---|---|---|---|
| 1.0 | 80 | −2.04 | −.049 |
| | 170 | −1.75 | −1.75 |
| 5.0 | 80 | −3.32 | −2.00 |
| | 170 | −4.18 | −2.05 |
| 10.0 | 80 | −3.32 | −5.15 |
| | 170 | −3.74 | −5.60 |

The biocides were effective at reducing the bacteria counts, with the biocide made using more hypochlorite being more effective.

Example 6

A biocide was prepared as in Example 1. Samples of the biocide after addition of 50 and 200 ml hypochlorite (N:Cl ratios of 2.05 and 0.63, respectively) were taken, and the UV-vis spectrum of the samples was measured. Both samples had the same spectrum including the monochloramine peak at 245 nm and no additional peaks related to higher chlorinated amines. This shows that the active biocide is monochloramine even after passing the apparent equimolar point. This result demonstrates the need for careful control of the biocide production and shows that excess hypochlorite does not necessarily lead to higher chlorinated amines and degradation of the monochloramine biocide.

Example 7

A solution of ammonium sulfate equimolar to 6,000 ppm sodium hypochlorite as $Cl_2$ (about 5600 ppm ammonium sulfate) was prepared. 100 ml of the ammonium sulfate solution was titrated with a 6,000 ppm solution of sodium hypochlorite. The pH of the solution was monitored throughout the titration. Samples were taken after adding 10, 50 and 100 ml (maximum pH), and the efficiency of kill of the produced biocide was checked against a culture of *E. coli*. The biocide feed rates checked were 0.4 and 0.6 ppm. The results are shown in Table 5.

TABLE 5

*E. coli* kill results with biocide produced from ammonium sulfate

| Biocide concentration (ppm as total chlorine) | Total hypochlorite (ml) | Log reduction | N:Cl ratio |
| --- | --- | --- | --- |
| 0.4 | 10 | −2.00 | 10 |
|  | 50 | −2.00 | 2 |
|  | 100 | −5.40 | 1 |
| 0.6 | 10 | −3.82 | 10 |
|  | 50 | −3.91 | 2 |
|  | 100 | −4.30 | 1 |

The efficiency of the biocides was much lower when the biocides contained excess ammonium salt. It appears that, unlike what was previously believed about the benign nature of the excess ammonium, excess ammonium interferes with the activity of the biocide. Furthermore, reaching the equimolar point, which was avoided in the past for fear of degradation by excess hypochlorite, actually improves biocide efficacy.

Example 8

Figure 4:
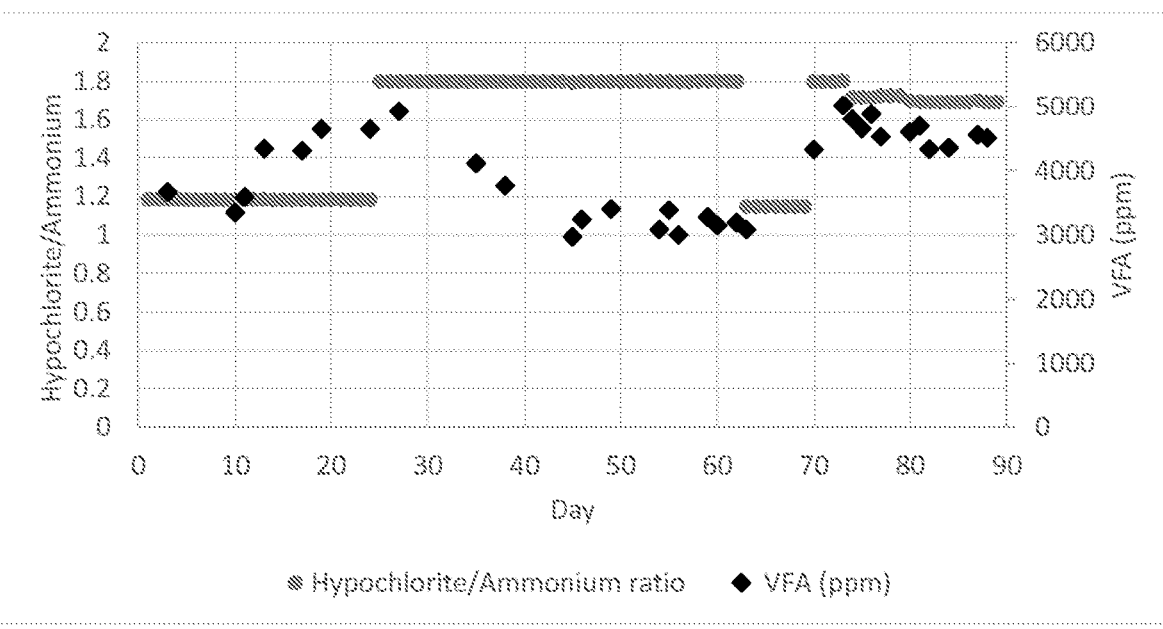
FIG. 4 is a graph showing the ratio of hypochlorite:ammonium salt used to produce a biocide for a packaging machine and the level of volatile fatty acids produced by microorganisms in the packaging machine over time.

To a packaging machine was fed a biocide produced from ammonium carbamate and sodium hypochlorite, initially at a weight ratio calculated to be equimolar. The level of volatile fatty acids (VFA) produced by bacteria was monitored. The VFA level was initially stable, but due to some upset to the system, the VFA level increased. The ratio of ammonium carbamate to hypochlorite was decreased and the VFA began to drop. When the ratio was returned to the apparent equimolar ratio, the VFA began to rise again, and then began to drop when the ratio was lowered again. The results are shown in FIG. 4. This shows that setting the ratio for ammonium carbamate to hypochlorite to 1:1 is not sufficient for effective control. Rather, some parameter must be monitored and the ratio of the two components adjusted so as to avoid excess ammonium.

It will be appreciated by persons skilled in the art that the present invention is not limited to what has been particularly shown and described hereinabove. Rather the scope of the present invention includes both combinations and subcombinations of various features described hereinabove as well as modifications thereof which would occur to a person of skill in the art upon reading the foregoing description and which are not in the prior art.

The invention claimed is:

1. A method for producing a biocide comprising:
   providing a solution of a hypochlorite oxidant;
   providing a solution of an ammonium salt;
   mixing said solution of a hypochlorite oxidant with said solution of an ammonium salt to form a mixture at an initial ammonium:hypochlorite molar ratio of greater than 1:1 while monitoring the conductivity of the mixture; and
   reducing the ammonium:hypochlorite molar ratio until the conductivity reaches a maximum;
   wherein a final molar ratio of said ammonium to said hypochlorite oxidant is less than 1:1.

2. The method according to claim 1, wherein said hypochlorite oxidant is sodium hypochlorite.

3. The method according to claim 1, wherein said providing a solution of a hypochlorite oxidant comprises diluting a concentrated solution of about 8-18% with water immediately prior to use.

4. The method according to claim 1, wherein said solution of a hypochlorite oxidant has a concentration from about 1000 to about 20,000 ppm.

5. The method according to claim 1, wherein said solution of a hypochlorite oxidant has a concentration from about 3000 to about 10,000 ppm.

6. The method according to claim 1, wherein said solution of a hypochlorite oxidant has a concentration from about 3500 to about 7000 ppm.

7. The method according to claim 1, wherein said ammonium salt is selected from ammonium bicarbonate, ammonium carbonate, ammonium carbamate, ammonium hydroxide, ammonium sulfamate, ammonium bromide, ammonium chloride and ammonium sulfate.

8. The method according to claim 1, wherein said ammonium salt is selected from ammonium carbamate, ammonium bromide, ammonium hydroxide and ammonium sulfate.

9. The method according to claim 1, wherein said ammonium salt is ammonium carbamate.

10. The method according to claim 1, wherein said ammonium salt is a mixture of two or more ammonium salts.

11. The method according to claim 1, wherein said providing a solution of an ammonium salt comprises diluting a concentrated solution of about 15-50% with water or with said solution of a hypochlorite oxidant immediately prior to use.

12. The method according to claim 1, wherein said solution of an ammonium salt has a concentration from about 1,000 to about 50,000 ppm.

13. The method according to claim 1, wherein said solution of an ammonium salt has a concentration from about 12,000 to about 30,000 ppm.

14. The method according to claim 1, wherein said solution of an ammonium salt further comprises a base.

15. The method according to claim 14, wherein said base is sodium hydroxide.

16. The method according to claim 1, wherein said method comprises:
   providing an amount of said solution of an ammonium salt;
   adding a plurality of amounts of said solution of a hypochlorite oxidant to said amount of said solution of an ammonium salt under mixing conditions;
   measuring the conductivity after the addition of each amount of said solution of a hypochlorite oxidant; and
   ceasing to add amounts of said solution of a hypochlorite oxidant when the maximum in the conductivity is observed after the observation of a conductivity minimum.

17. The method according to claim 1, wherein said method comprises:

mixing a stream of said solution of hypochlorite oxidant with a stream of said solution of the ammonium salt in a mixing chamber at an ammonium:hypochlorite molar ratio of greater than 1:1;

holding the flow rate of one of said streams constant and gradually increasing or decreasing the flow rate of the other of said streams in order to decrease said ammonium:hypochlorite molar ratio;

monitoring the value of the conductivity in a stream leaving said mixing chamber; and selecting an ammonium:hypochlorite molar ratio to be equal to the ammonium:hypochlorite molar ratio wherein the conductivity value has a local maximum.

18. The method according to claim 17, wherein said monitoring is continuous.

19. The method according to claim 17, wherein said monitoring comprises measuring the control parameter in discrete samples of said stream leaving said mixing chamber.

* * * * *